Patented Oct. 10, 1950

2,525,321

UNITED STATES PATENT OFFICE 2,525,321

HYDROXYBENZENESULFONAMIDOISOXA-ZOLES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,826

9 Claims. (Cl. 260—307)

This invention relates to new and useful sulfonamides and to the methods of preparing the same.

This application is a continuation-in-part of application Serial Number 25,524, filed May 6, 1948, entitled Hydroxysulfonamides and Preparation of the Same.

It has been discovered that certain p-hydroxybenzene - sulfonamido - oxazoles and isoxazoles possess unexpected anti-viral activity, particularly in the neurotropic viral diseases and may, therefore, become important drugs in the treatment of these and related diseases. The new compounds of the present invention may be represented by the general formula:

in which R represents hydrogen, aliphatic, aralkyl, or heterocyclic radical. Z represents an oxazole or isoxazole radical attached to the amide nitrogen by a carbon adjacent to the oxygen atom of the ring and R' represents hydrogen or an acyl group. Hereinafter the term oxazole will be used to indicate the isomeric oxazole and isoxazole radicals. The oxazole radical may bear one or more substituent radicals at the remaining positions such as alkyl, aryl, aralkyl and the like or it may form part of a condensed heterocyclic system.

The hydrogen atom of the phenolic OH radical as well as that attached to the amide nitrogen where R equals hydrogen are acidic in nature and may be replaced by simple neutralization or otherwise with a cationic radical of a metal or an organic base. Such salts are of particular value especially in that the solubility of the compound is affected thereby, usually increased. Obviously such salts are included with the scope of the present invention.

The new p - hydroxybenzenesulfonamidooxazoles or p - hydroxybenzenesulfonamidoisoxazoles may be prepared by several distinct methods, the more important of which will be described in the specific examples which follow. The preferred method is by the hydrolysis of a suitable ester of a p-hydroxybenzenesulfonamido-oxazole or -isoxazole under either acidic or alkaline conditions whereby the —OH group is formed in the reaction. These esters which have the general formula

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an amino oxazole or amino isoxazole in accordance with the following equation:

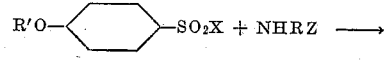

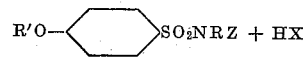

In the above R' is an acyl radical such as benzoyl, acetyl, furoyl, tosyl, carbethoxy or the like which may later be removed by hydrolysis. X is a halogen, preferable chlorine, but if desired fluorine or bromine. Z is a radical such as mentioned above at which the amino group is attached to a carbon atom in the oxazole ring.

To prepare intermediates in which R is an organic radical of the kind mentioned above, secondary amines such as 2-N-(beta-hydroxyethyl)-aminooxazole, 2-(N-methylamino) oxazole and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and in slight molecular excess, usually about 1 mol, is preferred. Other alkaline hydrolyzing agents including potassium hydroxide, barium hydroxide, calcium hydroxide, trimethylbenzylammonium hydroxide or other quarternary hydroxides, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-aminobenzenesulfonamidooxazoles. This process involves diazotization of the p-amino- group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will be illustrated by the preparation of a representative p-hydroxybenzenesulfonamidoisoxazole in the following example. All parts are by weight unless otherwise indicated.

Example

Eighty parts of 3-phenyl-5-aminoisoxazole (M. P. 11–112° C.; Burns J. prakt. Chem. 47, 123) is dissolved in 200 parts by volume of a 50–50 mixture of acetone and pyridine. 4-p-toluene-sulfonyloxybenzenesulfonyl chloride (M. P. 80–82°), 175 parts, is then added in small portions with stirring and external cooling so that the temperature does not exceed 50° C. After addition is complete, the reaction mixture is stirred ½ hour at 40° and then allowed to stand overnight at room temperature (25–30°). The reaction mixture is diluted with 500 parts of water and the whole is poured on 1,500 parts of flake ice. The crude product separates as a pyridine complex in the form of an oily residue which is made to crystallize by cooling, washing with water and finally triturating with alcohol. The crystalline N-(3-phenyl-5-isoxazolyl)-1-p-toluenesulfonylbenzene-4-sulfonamide pyridine complex is further purified by recrystallization from alcohol from which it is obtained in the form of almost white crystals having a melting range of 137–138.5 and containing one mole of pyridine.

Twenty-two parts of N-(3-phenyl-5-isoxazolyl)-1-p-toluenesulfonyloxybenzene-4-sulfonamide pyridine complex is suspended in 5 times its weight of water, 24 parts by volume of 5 N sodium hydroxide is added and the resulting solution is heated on the steam bath for 1 hour during which time pyridine is evolved. The solution is then treated with decolorizing carbon, filtered and the product precipitated by the addition of dilute hydrochloric acid to a pH of about 3. The product, N-(3-phenyl-5-isoxazolyl)-1-phenol-4-sulfonamide, is purified by reprecipitation and by recrystallization from 25% alcohol from which it is finally obtained in the form of fine, white silky needles having a melting range of 91–93°. These crystals contain about ¾ mole of water which cannot be removed by drying over P₂O₅.

In accordance with the above disclosed method the following p-hydroxy-benzenesulfonamidooxazoles and p-hydroxybenzenesulfonamidoisoxazoles may be prepared:

N-(2-oxazolyl)-1-phenol-4-sulfonamide;
N-(3-methyl-5-isoxazolyl)-1 phenol-4 sulfonamide;
N-(4-methyl-5-isoxazolyl)-1 phenol-4 sulfonamide;
N-(4-methyl-2-oxazolyl)-1 phenol-4 sulfonamide;
N-(3,4-dimethyl-5-isoxazolyl)-1-phenol-4-sulfonamide;
N-(4-phenyl-5-oxazolyl)-phenol-4-sulfonamide;
N-(5-phenyl-2-oxazolyl)-1 phenol-4-sulfonamide;

from the corresponding oxazolamines or isoxazolamines.

The above and other p-hydroxybenzenesulfonamidooxazoles and p-hydroxybenzenesulfonamidoisoxazoles may also be prepared by diazotizing and subsequently decomposing the diazo group of analogous sulfanilamidoxazoles and sulfanilamidoisoxazoles.

What we claim is:

1. Compounds having the formula

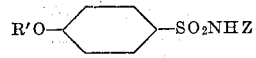

where R' is a member of the group consisting of H and acyl radicals and Z is a heterocyclic radical chosen from the group consisting of isoxazoles and oxazoles, and salts of said compounds.

2. Compounds having the general formula

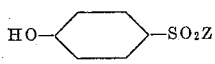

where Z is an isoxazole radical, and salts of said compounds.

3. Compounds having the general formula

where R' is an acyl group and Z is an isoxazole radical, and salts of said compounds.

4. N-(3-phenyl-5-isoxazolyl)-1 phenol-4-sulfonamide.

5. N-(3-methyl-5-isoxazolyl)-1 phenol-4-sulfonamide.

6. N-(4-methyl-5-isoxazolyl)-1 phenol-4-sulfonamide.

7. The process of preparing p hydroxybenzenesulfonamido-derivatives of isoxazoles which comprises hydrolyzing a compound having the general formula

where R' is an acyl radical and Z is an isoxazole radical until the acyl group R' is removed.

8. The process of preparing p hydroxybenzene-sulfonamido-derivatives of isoxazoles which comprises hydrolyzing a compound having the general formula

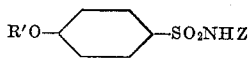

where R' is an acyl radical and Z is an isoxazole radical in the presence of water and an alkaline hydrolyzing agent at a temperature in the range 0–150° C. until the acyl group is removed.

9. In the process of preparing N-(3-phenyl-5-isoxazol)-1-phenol-4-sulfonamide, the step which comprises treating 3 - phenyl - 5-isoxazolyl-1-p-toluenesulfonyloxybenzene - 4-sulfonamide with an alkaline hydrolyzing agent until N-(3-phenyl-5 - isoxolyl) - 1-phenol-4-sulfonamide is formed and recovering said product.

MARTIN E. HULTQUIST.
ALOYSIUS J. BRYANT,
Administrator Estate of Yellapragada SubbaRow, Deceased.

REFERENCES CITED

The following references are of record in the file of this patent:

Anderson, Jr. Amer. Chem. Soc., vol. 64, pp. 2902–2905 (1934).

Billon, Biologie Medicale, vol. 27, Supplement 1937, p. 84.

Kermack, Jr. Chem. Society (London), 1939, pp. 608–609.